April 21, 1959  M. CHRISTENSEN  2,882,981
DISC HARROW TRANSPORT ASSEMBLY
Filed Jan. 5, 1955

Moodie Christensen
INVENTOR.

BY Arthur H. Sturges,
Attorney

United States Patent Office 2,882,981
Patented Apr. 21, 1959

2,882,981

DISC HARROW TRANSPORT ASSEMBLY

Moodie Christensen, Hornick, Iowa

Application January 5, 1955, Serial No. 479,967

3 Claims. (Cl. 172—241)

The instant invention relates to disc harrows and has for an object to provide a device which may be readily attached to a disc harrow of any type for use during the transportation of the harrow to and from a work field in a manner whereby the discs of the harrow remain sharp.

More particularly it is an object of the invention to mount spaced wheels on the frame of a harrow in a manner whereby the normal operation of the harrow remains the same while doing work and upon the completion of the work the harrow may be turned over for causing said wheels to engage the surface of the soil or roadway during a transportation of the harrow from and to a work field.

A further object of the invention is to provide a means for supporting a frame of a disc harrow upon the surface of the soil with the discs disposed upwardly, whereby said discs may be readily removed for sharpening the latter.

Other and further objects and advantages of the invention will be understood from the following detailed description thereof.

Figure 1:
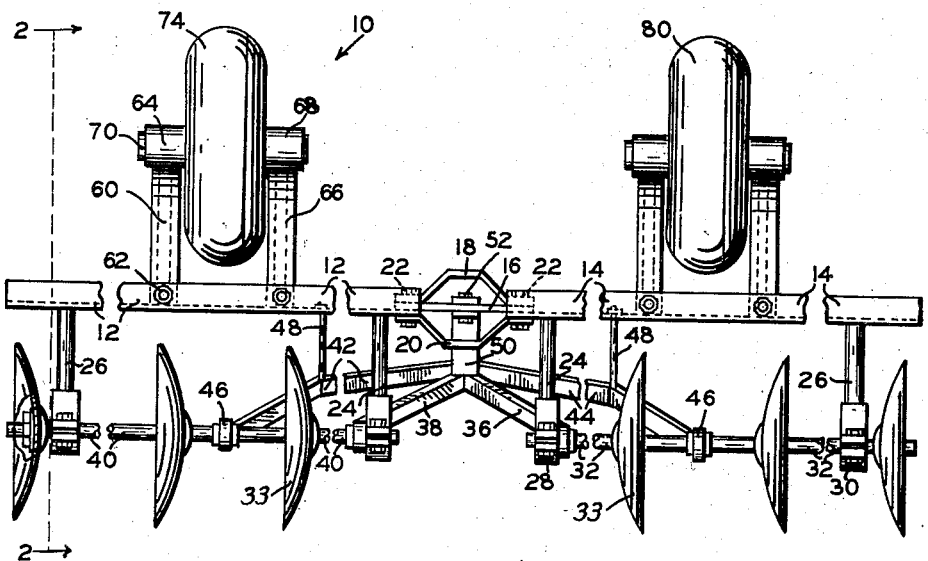
Figure 1 is a rear elevation of a disc harrow, certain portions thereof being broken away for convenience of illustration and depicting a preferred embodiment of the instant invention applied thereto.

It is well known that as heretofore practiced, a towing of a disc harrow upon a roadway or the like dulls the perimetrical edges of the discs; that it is expensive to remove the discs from the harrow frames for sharpening said discs, and that it is also expensive to work the soil with a harrow the edges of the discs of which are dull, and the instant invention aims to provide an economical means for obviating the said difficulties of the prior practice.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, and 12 indicates a half portion of the frame of a disc harrow. The said half portion is pivotally connected to a second and like half portion 14. It will be understood that the half portions are of any desired length. The said half portions are pivotally connected together by means of a towing link 16, together with an upper bridge 18 and a lower bridge 20, by means of pivot pins or bolts 22 which extend through the opposite ends of the towing link and said bridges respectively. The half portion 12 of the frame is swingable on its pivot pin 22 in a horizontal direction and the half portion 14 is similarly swingable on its pivot pin.

The certain type of harrow depicted in Figure 1 includes the bridges 18 and 20, and it will be understood that the frame portions 12 and 14 may be formed integral, if desired, as is often the case.

Since the frame 14, together with its adjunct parts, is of like construction with respect to the half portion 12, but one is minutely described herein.

The frames 12 and 14 are channel-shaped in cross section, each having a base plate 11 with flanges 13 and 15 at the sides.

Figure 2:
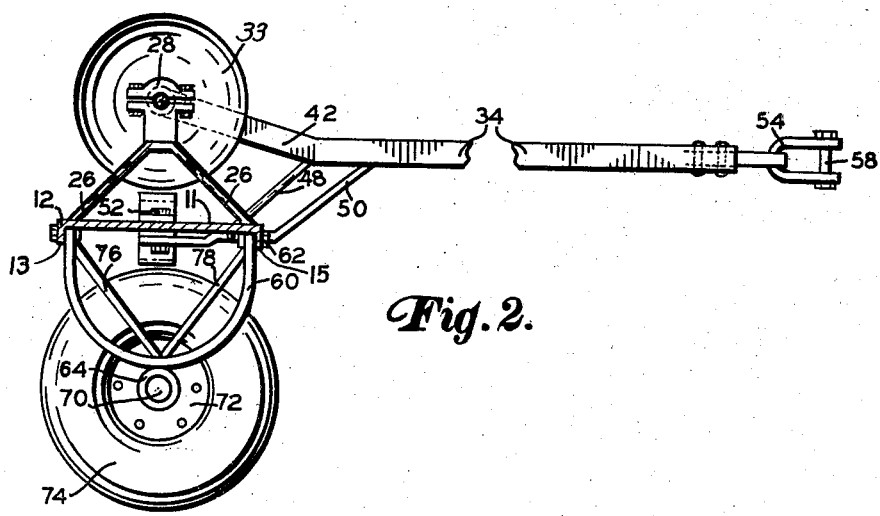
Figure 2 is a vertical section taken substantially on line 2—2 of Figure 1 and showing the said embodiment in an upside-down position with respect to the showing thereof in Figure 1, a portion of the towing tongue of the harrow being broken away.

The frame 14 is provided, adjacent to its ends, with like triangular-shaped supports 24 and 26 formed with inclined bars, the upper ends of which are welded to the frame 14. The lower ends of the supports are provided with journaled bearings 28 and 30, respectively. A shaft 32 extends through said bearings for supporting spaced cultivator discs 33 thereon, said discs being attached to the shaft 32 by any suitable means. Referring to Figure 2, the cultivator includes a towing tongue 34, the rearward end of which is bifurcated, the said bifurcations being indicated at 36 and 38 in Figure 1. The rearward ends of the bifurcations are pivotally attached to the shaft 32 and to the like shaft 40 of the frame 12, respectively. The rearward ends of diverging sections of tow members 42 and 44 are journaled, as at 46 to the shaft 40 and the shaft 32, respectively. The forward ends of said tow members are joined to the tongue 34.

From the said frames like hanger straps 48 are suspended, being joined to the tow members 42 and 44, respectively.

As best shown in Figure 2, the tow bar 34 is provided with a link 50 connected at one of its ends to the tow bar and the other end of the link 50 is bifurcated, the said bifurcations being disposed above and below the tow link 16, respectively, being connected to the tow link by means of a pin 52.

The forward end of the tow bar 34 is provided with a clevis 54 for connecting it to the towing step of a tractor by means of a king pin 58.

It will be understood that the above-described disc harrow is of any conventional type, and that during use, bags of sand or the like weights are loaded upon frames 12 and 14 for weighting said frames so that the discs sink into the ground a desired distance during cultivating operations and in accordance with the condition of the soil.

The new device includes oppositely disposed semi-circular supports 60. As best shown in Figure 2, the support 60 there shown is attached to the flanges of the channel frame 12 by means of bolts 62. The support 60 is provided with a journaled bearing or pillow block 64, and the oppositely disposed like support 66 (Figure 1) is provided with a similar pillow block 68. An axle 70 extends through the pillow blocks 64 and 68, and on said axle a wheel rim 72 is rotatably disposed between said pillow blocks. The wheel rim 72 may be plain if desired, and preferably it is provided with a pneumatic tire 74 mounted thereon. The tire is inflatable through its conventional valve stem. The perimeter of the tire 74 is disposed above and spaced away from the frame 12 as best shown in Figure 1.

The frame 14 is provided with a like assembly of supports, a wheel and an axle, which are also bolted to the flange of the platform 14.

If desired, the device may further include braces 76 and 78, ends of which are joined to the support 60 adjacent to the pillow block 64, as best shown in Figure 2, the other ends of said braces being welded to the oppositely disposed end portions of the support 60. Like braces are provided for the support 66 and further braces for the supports for the wheel 80. Preferably, two supports or standards such as indicated at 60 and 66 are employed for the wheel 74, and it will be understood that but a single standard may be employed for said purpose, if desired.

Operation

As shown in Figure 1, the disc cultivator is in a working position for treating the soil during forward movements of the cultivator when the latter is towed by a tractor, said tractor not being shown in the drawings. At this time the wheels 74 and 80 are disposed above the cultivator discs, as shown in Figure 1.

In order to convert the device to a transporting position the king pin 58 is removed from the clevis 54 and uncoupled from the tractor, whereupon the operator grasps the free end of the tow bar 34 and swings the tow bar in a vertical direction defining a semi-circle, thereby turning the cultivator discs to an upward position, as shown in Figure 2, and the wheels 74 and 80 into contact with the ground. Since the tow bar 34 is comparatively long, a large amount of leverage is provided for turning the cultivator upside down readily.

The clevis is then re-attached to the tractor for moving the cultivator over roadways and the like and upon the wheels 74 and 80 then in contact with the soil or roadway.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

I claim:

1. In a disc harrow transport assembly, the combination which comprises a pair of horizontally disposed frames positioned in end to end relation, vertically disposed supports having bearings on lower ends thereof depending from said frames and spaced inwardly from ends thereof, aligned shafts rotatably mounted in the bearings of the supports, cultivating discs carried by said shafts, said frames being channel-shaped in cross section, pairs of semi-circular supports having bearings on upper ends thereof extended upwardly from said frame, axles rotatably mounted in the bearings of the semi-circular supports, wheels mounted on the axles, a tongue having a bifurcated end with diverging sections extended from the harrow and positioned with the diverging sections pivotally connected to the disc carrying shafts, tow members extended from sides of the tongue and positioned with extended ends thereof pivotally connected to the shafts, hanger straps extended from the frames and connected to the tow members of the tongue, and upper and lower bridge elements connecting inner ends of the frames.

2. In a disc harrow transporting assembly, the combination which comprises a horizontally disposed frame, channel-shaped in cross section, having a base plate with flanges at the sides, spaced semi-circular supports with aligned bearings on extended portions thereof mounted on one side of the frame, an axle rotatably mounted in the bearings of the supports, a wheel mounted on the axle, inclined bars spaced inwardly from ends of the frame and extended from the side of the frame opposite to that on which the supports are positioned, the bars providing triangular-shaped supports, aligned bearings positioned on extended ends of the triangular-shaped supports, a shaft rotatably mounted in the bearings of the triangular-shaped supports, the said axle and shaft being in a common vertical plane, spaced discs mounted on the shaft, a tongue positioned at a right angle to the plane extended through the axle and shaft, the tongue having an inclined section rotatably mounted on the shaft, and braces supporting the frame from the tongue, the tongue extending from one side of the transport with the wheel extended downwardly and from the opposite side with the discs extended downwardly.

3. In a disc harrow transport assembly, the combination which comprises spaced horizontally disposed frames, channel-shaped in cross section, each having a base with flanges at the edges, spaced semi-circular supports with aligned bearings on extended portions thereof mounted on one of the sides of each of the frames and extended from said frames, axles rotatably mounted in the bearings of the supports, wheels mounted on the axles, inclined bars spaced inwardly from ends of the frames and extended from the sides of the frames opposite to the sides from which the supports extend, the bars providing triangular-shaped supports, aligned bearings positioned on extended ends of the triangular-shaped supports, shafts rotatably mounted in the bearings of the triangular-shaped supports, discs mounted on the shafts, the said axles and shafts being in common vertical planes, a tongue positioned at a right angle to the plane extended through the axles and shafts, the tongue having a bifurcated end with sections thereof rotatably connected to the shafts, braces connecting the tongue to the frames, and upper and lower bridge elements connecting inner ends of the frames.

References Cited in the file of this patent

UNITED STATES PATENTS

| | | |
|---|---|---|
| 305,923 | Hering et al. | Sept. 30, 1884 |
| 1,176,514 | Berthelote | Mar. 21, 1916 |
| 2,109,098 | Baxter | Feb. 22, 1938 |
| 2,524,330 | Rossi | Oct. 3, 1950 |
| 2,543,377 | Progneaux | Feb. 27, 1951 |
| 2,654,198 | Ryan | Oct. 6, 1953 |

FOREIGN PATENTS

| | | |
|---|---|---|
| 855,631 | Germany | Nov. 13, 1952 |
| 10,172 | Great Britain | of 1844 |